United States Patent [19]
Yang

[11] 3,852,083

[45] Dec. 3, 1974

[54] MANUFACTURE OF PLASTER OF PARIS PRODUCTS CONTAINING LATEX

[76] Inventor: Julie Chi-sun Yang, 45L Franklin Green South, Somerset, N.J. 08873

[22] Filed: Sept. 22, 1972

[21] Appl. No.: 291,498

Related U.S. Application Data

[63] Continuation-in-part of Ser. No. 239,752, March 30, 1972, abandoned.

[52] U.S. Cl.................. 106/111, 106/115, 106/116
[51] Int. Cl............................................. C04b 11/00
[58] Field of Search..................... 106/111, 115, 116

[56] References Cited
UNITED STATES PATENTS

| | | | |
|---|---|---|---|
| 2,483,806 | 10/1949 | Buckley et al. | 106/96 |
| 3,219,467 | 11/1965 | Redican | 106/90 |
| 3,240,736 | 3/1966 | Beckwith | 260/29.2 |

FOREIGN PATENTS OR APPLICATIONS

| | | | |
|---|---|---|---|
| 749,002 | 5/1956 | Great Britain | 106/88 |
| 815,184 | 6/1959 | Great Britain | 106/115 |

*Primary Examiner*—Delbert E. Gantz
*Assistant Examiner*—S. Berger
*Attorney, Agent, or Firm*—John A. McKinney; Robert M. Krone; James W. McClain

[57] ABSTRACT

A process is described for the production of fiber-containing plastic-formed plaster of Paris products which have superior hardness, surface smoothness and flexural strength as well as good extrusion characteristics and physical integrity. In the process of this invention a composition comprising specified concentrations of plaster of Paris, natural or synthetic fiber, latex, hydromodifier and water is formed into a plastic tractable mixture which may be extruded, molded, or otherwise plastic-formed under pressure and then set to produce the desired shaped product. Additional materials such as auxiliary cementing agents, fillers and the like may also be present.

26 Claims, No Drawings

MANUFACTURE OF PLASTER OF PARIS PRODUCTS CONTAINING LATEX

CROSS-REFERENCE TO RELATED APPLICATION

This application is a continuation-in-part of application Ser. No. 239,752, filed on Mar. 30, 1972, and now abandoned.

FIELD OF THE INVENTION

This invention relates to novel fiber-containing plaster of Paris products and methods for the manufacture of such products. More particularly, it relates to plaster of Paris based compositions which contain, in addition to fiber, a specified amount of latex, and to methods for producing the novel latex-fiber-plaster of Paris compositions.

Plaster of Paris is the hemihydrate of calcium sulfate and has the formula ($2CaSO_4 \cdot H_2O$). It is generally produced by incompletely calcining gypsum ($CaSO_4 \cdot 2H_2O$). Plaster of Paris is sometimes classified as a hydraulic cement, although it differs from most hydraulic cements in that it is water soluble. Plaster of Paris is typically used for such products as wallboard, tile, and building block.

It has been known for some time that plaster of Paris materials can be significantly reinforced in strength by inclusion in the composition of fibers, either inorganic or organic. Typical of the fibers which have been used in the past are inorganic natural fibers such as asbestos; inorganic synthetic fibers such as fiber glass; natural organic fibers such as wood fibers; and natural synthetic fibers such as rayon and nylon.

Extrusion has been known for some time to be an economical and advantageous method of producing intricately shaped structural products for use in residential and commercial building construction. Typical of the construction products which are advantageously produced by extrusion are hollow core ribbed or unribbed wallboard, which combines unique insulating and acoustical properties with a substantial reduction in weight over conventional solid materials; decorative ribbed panels; and ducts. Extruded ducts are particularly advantageous where unusual cross-sections, designed to overcome particular architectural problems, are required. Until recently however, extrusion of fibrous hydraulic cement articles was accomplished only with great difficulty because of the tendency of water to separate from the extrusion mixture, a phenomenon referred to as "dewatering." This problem has recently been overcome and extruded fiber-containing hydraulic cement products readily produced by incorporation into the extrusion mixture of materials referred to "hydromodifiers" in a process described and claimed by Redican, Blair, Yang, and Gorman in U.S. Pat. No. 3,219,467.

Among the materials which have been extruded by various methods, including those described in this patent, are various compositions of fiber-containing plaster of Paris. Examination of such plaster of Paris extrudates, however, have in a number of cases revealed less than desirable conditions of hardness, surface smoothness and flexural strength of the product, even though no dewatering occurred. The presence of such conditions in the product, of course, can lead to unacceptably high rates of rejection by commercial customers of finished product. This in turn can induce potential users to forego the use of the extrusion process to produce plaster of Paris structural elements, thus forsaking the recognized advantages of the process. It would therefore be of significant benefit to develop a method for producing fiber-containing plaster of Paris compositions which would consistently posses superior hardness, surface smoothness and flexural strength while retaining the ease of extrusion and the product integrity possessed by the products described in the aforesaid U.S. Pat. No. 3,219,467. The process should also permit use of a wide variety of compositions and reaction conditions without deterioration of the product.

DESCRIPTION OF THE PRIOR ART

The process of forming hydraulic cement-fiber extrudated with the use of hydromodifiers is described in aforesaid U.S. Pat. No. 3,219,467, which is discussed in detail above. British Pat. No. 815,184 describes the extrusion of plaster of Paris-fiber compositions, but does not indicate any method for improving the hardness, smoothness, and strength properties. Incorporation of latices into Portland cement compositions, not including fiber nor intended for extrusion, is described in Volume 8 of the *Encyclopedia of Polymer Science and Technology* (chapter on "Latex;" 1968).

SUMMARY

This invention is a process whereby fiber-containing plaster of Paris products of consistently superior quality can be formed by extrusion. The compositions described herein are readily extrudable by the method of this invention. The products of this invention so formed have excellent hardness, flexural strength, surface characteristics, and shape retaining properties. In addition, they possess to a high degree the most significant characteristics of the prior art extrudates: physical integrity and the ability to be shaped into intricate and complex forms.

It has now been discovered that products having these unique and superior properties can consistently be produced in good yield by the following process. This process, which can be described as a method of producing good quality, shaped, set plaster of Paris products, comprises first providing an unset mixture (or furnish) comprising plaster of Paris, water, hydromodifier, fiber, and latex, in defined amounts such that a plastic tractable mixture having shape-retaining characteristics, enhanced plastic flow characteristics, and physical integrity under pressures on the order of those occurring in extrusion products is formed; plastic forming the unset mixture under such pressures to form the shaped body which is generally shape retaining; and finally subjecting the shaped body to plaster of Paris setting conditions to set the shaped body and impart strength to the resulting product. Products of this invention are thus novel shaped compositions of plaster of Paris, hydromodifier, fiber, and latex.

Alternatively, this invention may be considered to be a process for the production of good quality, shaped, set plaster of Paris products comprising forming an unset mixture containing plaster of Paris, hydromodifier, fiber, and water in proportionate amounts to form a plastic mixture; plastic forming the mixture under pressures of the order of those occurring in fiber-containing cement extrusion processes to form a shaped body; and then subjecting the shaped body to plaster of Paris setting conditions to set the plaster and impart hardness to the final product; in which the improvement comprises incorporating into the unset mixture a defined amount of a latex, the latex serving to improve hardness, surface smoothness and flexural strength of the final plastic formed product. The products of this invention are the shaped, hardened bodies composed of plaster of Paris, hydromodifier, fiber, and latex in defined quantities, and produced by the claimed method.

DETAILED DESCRIPTION OF THE INVENTION

This invention is a process for the production of high-quality shaped set plaster of Paris articles by plastic forming. This process produces plaster of Paris articles having consistently superior hardness (as measured by the flexural modulus of rupture), in many cases increasing the strength by a factor of two or three or more over many of the products of the prior art. Products produced by the process of this invention also have good surface characteristics, physical integrity and the ability to be plastic formed into a wide variety of intricate configurations. When operated in accordance with the description herein, the process of this invention consistently produces a high yield of good quality plastic formed or extruded products with a very low rejection rate of subspecification materials. The process is amenable to use with a wide varity of compositions within the composition ranges described. Consequently, a large number of different types and shapes of products can be obtained giving the process the versatility to produce plaster of Paris products to meet a wide variety of architectural requirements.

The products of this invention are plastic formed or extruded bodies principaly useful as structural components in building construction. They are readily extruded in conventional extrusion equipment and can be produced in a wide variety of shapes. They possess good hardness, surface smoothness and physical integrity characteristics. They can be produced in a wide range of densities and water contents. In addition, if desired, they may contain any of a wide variety of additives designed to impart such characteristics as color and good compatability with surface coatings.

The process of this invention is a method of producing good quality, shaped, cured or set plaster of Paris products, which comprises (a) providing an unset or uncured mixture comprising:

| Component | Suitable Concentrations wt. % (dry basis) | |
|---|---|---|
| | Broad | Preferred |
| Plaster of Paris | 30–80 | 45–75; 50–70 |
| Fiber: Natural | 2–30 | 3–23; 5–20 |
| Synthetic | 0.1–2.5 | 0.3–1.5; 0.5–1.2 |
| Hydromodifier | 0.50–10 | 0.10–1.5; 0.15–0.70 |
| Latex | 0.5–10.0 | 0.9–6.0; 1.0–5.0 |
| Siliceous Auxiliary Cementing Agent | 0–60 | 5–50; 5–30 or 30–50 | with the concentrations individually selected to total 100 wt.%, and also including water in a water:solids weight ratio in the range of from about 0.20:1 to about 0.80:1, preferably from about 0.25:1 to about 0.65:1; with the proportionate amounts being such as to cause the mixture to be a plastic tractable mixture having shape retaining characteristics; that is, a mixture being, in the proportionately higher water content ranges, moist to the touch, plastic but not fluid, shape-retaining, self-supporting, and evidencing substantially no flow characteristics when non-supported, and being in the proportionately lower water content ranges, substantially dry to the touch while being plastic and tractable, possessing sufficient rigidity to be broken and when broken not elongating at the break, characteristically being in the form of small stiff pellets, comprising rather crumbly particulate material, and not being readily compacted into preform shapes; and said mixture having enhanced plastic flow characteristics and capacity for resisting dewatering under relatively high pressures so as to enable the mixture to flow and to prevent the separation of an appreciable amount of water from the mixture when the mixture is subjected to pressures of considerable magnitude such as are normally developed in plastic forming operations exemplified by those employing ram and auger extruders; (b) plastic forming the mixture under pressure of the order described in part (a) above, without separating an appreciable amount of water from the mixture, to produce a shaped body which is generally shape retaining; and (c) subjecting the shaped body to plaster of Paris setting conditions to set the shaped body and impart strength to the resulting shape retaining set product. The products of the invention are good quality, shaped, cured or set plaster of Paris products comprising plaster of Paris, hydromodifier, fiber, and latex in the quantity as defined above on a dry basis, having good shape retaining characteristics, good hardness and being produced by the aforementioned process. A number of embodiments of both process and product are envisioned within this invention; these will be separately described below.

The principal component of the mixture which is subject to plastic forming in the process of this invention to form the products claimed herein is plaster of Paris. As used herein, the term "plaster of Paris" refers essentially to the hemihydrate of calcium sulfate. Since this is generally formed by the incomplete calcining of gypsum (the dihydrate of calcium sulfate), the actual overall plaster of Paris component may contain portions having greater or less than one-half mole of water of hydration per mole of calcium sulfate. Thus portions of the actual plaster of Paris as obtained may have up to two-thirds to three-fourths mole of water of hydration per mole of calcium sulfate, although the overall average for the entire plaster of Paris component will average essentially equal to the hemihydrate. A certain amount of anhydrous calcium sulfate will generally also be present in commercial batches of plaster of Paris; inclusion of anhydrite is permissible in the process of this invention and does not significantly affect the properties of the final products. Care should be taken however, to avoid the presence of gypsum in the reaction mixture, for gypsum acts as an accelerator in plaster of Paris, leading to a product which sets too quickly to permit proper plastic forming; thus the composition should contain essentially no gypsum. Plaster of Paris is readily available in various degrees of purity from numerous commercial sources, usually as a white powdery product of the calcination of gypsum at a temperature at or a little above 128°C (and below about 163°C).

The plaster of Paris will be present as 30 to 80 weight percent of the composition, calculated on a dry basis.

(All component concentrations herein are defined on a dry basis. Any water of solution, as with the latex, is incorporated in the description of water concentration below). It has been found that when the plaster of Paris concentration is low, flexural strength decreases; conversely when it is high, ease of plastic forming is lowered. Consequently, it is preferred to have the plaster of Paris concentration between 45 to 75 weight percent of the composition, and more preferably between 50 to 70 weight percent.

A second essential component of the composition is the fibrous material referred to herein simply as "fiber." A wide variety of fibers may be incorporated into the compositions of this invention. These include both organic and inorganic, natural and synthetic fibers.

It has been found that optimum results are obtained when natural inorganic fibers are used. Chief among these is asbestos. All types and grades of asbestos fibers may be used either alone or in mixtures, but chrysotile asbestos ("serpentine" group) is preferred. Other types of asbestos are also quite suitable including the crocidolite and amosite varieties of the "amphibole" group of fibers. The amphibole fibers are generally more brittle and have a harsher texture than the chrysotile fibers. Any of the grades of the grading system of the Quebec Asbestos Mining Association may be used. In this grading system the higher numbers in general indicate the shorter fibers; thus of the grades of fiber in general commercial use, grade 7 covers asbestos of the shortest fiber with the fiber becoming longer as the grades proceed up to grade 1. The preferred water content of the extrusion composition is dependent to some extent upon the asbestos type and grade, slightly more water for optimum extrudability being required with the longer fiber material, i.e., grade 4 asbestos requires more water than grade 6 and so on. Appropriate adjustment of the water content is well within the ordinary skill of those versed in the art.

A significant feature of this invention is the ability of the process to allow wider or increased use of lower cost grades of asbestos than had been practicable with prior processes for plastic forming of asbestos-plaster of Paris compositions. Shorter grades of asbestos (e.g., those of grades 5 to 7) are less expensive than the longer grades, and consequently this invention makes it possible to reduce the cost of asbestos-plaster of Paris products witout major sacrifice in strength or other desired properties.

Further, it has been found that extrusion problems are much more prevalent with compositions using the shorter grades of asbestos. While the success of extrusion is dependent upon a number of factors, including quality of the particular asbestos used, its concentration in the extruded mixture, and the amount of water used in the extrusion mix, it is generally true that, othe factors being relatively equal, the longer grades of asbestos will yield a larger proportion of satisfactory extruded products. However, it is still extremely difficult to obtain consistently good results, whether longer or shorter fibers of asbestos are used. For instance, fibers which may form a satisfactory extrudate under one particular combination of concentration, composition, and reaction conditions, may, in a slightly different combination of those variables, either yield an unsatisfactory extrudate or fail to extrude entirely. Such lack of consistency is most pronounced with the shorter grades of asbestos.

In addition to the natural inorganic fibers typified by asbestos, synthetic inorganic fibers are also quite suitable for use in this invention. Principal among these are the glass fibers. Glass fibers are conventionally produced in long continuous strands by a variety of methods all well known in the art. For this invention, the glass fibers must be chopped, attenuated, cut or otherwise broken down to small fiber lengths comparable to the lengths of asbestos fibers. The various glass compositions used in making fiber glass are well known and will not be described here. All the conventional glass fiber compositions are satisfactory for use in this invention.

Another suitable class of fibers for the practice of this invention are the natural organic fibers. These include such materials as fibers of cotton, paper, wood, wool, sisal, jute, hemp, flax, and the like. It is generally preferable to use a lower concentration of water with these fibers than with the asbestos or glass fibers. Similarly, organic synthetic fibers such as nylon, rayon or other synthetic polymers capable of being formed into strands which can be chopped to size may be used.

The fiber concentration in the present compositions will depend on the particular type of fiber being used. The natural fiber will be present in concentrations of 2 to 30, preferably 3 to 23, weight percent, while the synthetic fibers will be present in concentrations of 0.1 to 2.5, preferably 0.3 to 1.5, weight percent. The natural fibers are normally used in concentrations of 5 to 20 weight percent, while the synthetic fibers are used in concentrations of 0.5 to 1.2 weight percent. Because of the variation in the concentration of the fiber component, the concentrations of the remaining components will be varied within the defined ranges to compensate. Normally the concentration of the plaster of Paris and/or the siliceous auxiliary cementing agent will be increased when synthetic fibers are used and decreased when natural fibers are used, with the concentrations of the other components remaining relatively constant.

The term "latex," as used herein, refers to a rubber-like natural or synthetic polymer in emulsified form. Almost all of the emulsified polymer particles (greater than 90% and usually greater than 95%) will be less than 1 micron in diameter. Where the polymer is synthetic rather than natural, the particle size is generally smaller, usually with no particles greater than 0.2 micron in diameter.

The polymer used as the latex base may be natural or synthetic. Many of the natural polymers are those of natural rubber, which may be vulcanized to either a hard or soft rubber. Other polymers, which for the purpose of this invention may be considered to be "natural" polymers, include high molecular weight rubber-like hdyrocarbon polymers which are obtained from the separation and processing of crude oil.

Although the natural polymer emulsions are satisfactory for use in this invention, it is preferred to use the synthetic polymer emulsions. These include a wide variety of rubber-like polymer materials some of which are closely related to natural rubber. Those related to natural rubber generally include the butadiene polymers and the various polymers of butadiene derivatives. These include butadiene-styrene copolymer, butadiene-acrylonitrile copolymer, polychloroprene (Neoprene), as well as the many variations and derivatives of these materials such as the various GRS type synthetic rubbers and the Buna N and Buna S rubbers. A wide variety of materials of this type are on the market and the particular properties of each are well known and widely described in trade literature. A second large group of synthetic polymer latices are those derived from synthetic polymers which have rubber-like properties but are not directly related chemically to natural rubber. These include such materials as polyvinyl chloride and polyvinylidene chloride; polystyrene; polymethyl methacrylate, polyethyl acrylate, polyvinyl acetate, and copolymers of acrylic and methacrylic acid esters; copolymers of vinyl acetate and dibutyl maleate; terpolymers of butadiene, styrene and vinyl pyridine; polyvinyl butyral polymers; polytetrafluorethylene polymers; and the like. Here again, a wide variety of rubber-like polymers are known and the properties of the individual materials widely described in trade literature.

The particular latex emulsion used may contain a wide variety of minor materials such as preservatives, antioxidants, stabilizers, antifoaming agents, dispersing agents, thickners, accelerators, and fillers. These are conventional ingredients added in small amounts to commercial latices. Their presence or absence does not ordinarily affect the process of this invention nor the products produced thereby. They ordinarily function solely to maintain the desirable properties of the latex prior to the latter's incorporation into the products of this invention. Many of these materials are described in detail by Cook in *Latex: Natural and Synthetic* (1956); this text also details the composition and properties of many different latices.

The latex will be present in a concentration of from 0.5 to 10.0 weight percent, preferably 0.9 to 6.0 weight percent. Concentrations of from 1.0 to 5.0 weight percent are normally used. Since water usually comprises about 50% of the latex emulsion, the actual amount of emulsion will be about twice the above concentrations, since as noted above, all concentrations are specified on a dry basis and all water is accounted for separately.

The term "hydromodifier," as used herein, refers to materials as described in the aforesaid U.S. Pat. No. 3,219,467. Hydromodifiers may be anionic or preferably cationic or nonionic. They are stable in aqueous media having a pH between 10 and 12.5 and generally between 7 and 13; they do not exhibit decomposition, serious viscosity change, gelatin, flocculation or the like at such high alkalinity. They may be solid or liquid substances and may be chemically pure compounds, commercial products containing the impurities generally associated with such products, or mixtures thereof.

The basic property of all materials which will come within the definition of "hyromodifiers" is that they will pass the "cement slurry test" as defined in the aforesaid patent. The cement slurry test determines the workability and stability of the test substance in a plaster slurry and differentiates hydromodifiers from non-workable materials. The test involves a series of several carefully defined steps in which the test substance and the plaster of Paris are slurried together and the viscosity of the solution measured under several different conditions. The details of the test as set forth in U.S. Pat. No. 3,219,467 will not be repeated here; rather the entire description is hereby incorporated by reference into this specification.

Different extrusion compositions prepared with different materials produce varied results when attempts are made to extrude them. A hydromodifier, when added in the concentration as described herein, to the asbestos-plaster of Paris-latex mixture, will enable the test composition to leave the extrusion dye as a smooth homogeneous column having and maintaining width and thickness approximately equal to the dimensions of the die opening. At the same time, there is with hydromodifiers no splitting, cracking, curling, crumbling or reaction in any other manner which prevents a smooth homogeneous column from being obtained. Any material which does not comply with these conditions, in any possible concentration up to 10% of the wet mix, has been found to fail the cement slurry test and is not classifiable as a hydromodifier.

The following is a list of some of the substances which are hydromodifiers for use in accordance with this invention; methyl cellulose, hydroxypropylmethyl cellulose, ethylene oxide polymer, carboxymethylhydroxyethyl cellulose, hydroxyethyl cellulose ether, partially hydrolyzed polyacrylamide (sodium salt), casein, acrylamideacrylic acid copolymer, glud (hide), acrylamide polymer, carboxymethyl starch ether, polyvinyl alcohol, and the like. Hydromodifiers may be used singly, in mixtures of two or more, or in mixtures with supplementing materials which are not hydromodifiers. Those individual materials and combinations of materials which are satisfactory hydromodifiers will be unambiguously determined by their performance in the cement slurry test in combination with the asbestos-plaster of Paris-latex composition.

Methyl cellulose, hydroxypropylmethyl cellulose, and ethylene oxide polymers are preferred hydromodifiers. Of those commercially available, the methyl cellulose material available as "Methocel MC (4,000 cps)," the hydroxypropylmethyl cellulose material available as "Methocel 65 HG (4,000 cps)," and the ethylene oxide polymer available as "Polyox WSR 301" have been found to give highest strength results; however, all grade of commercial methyl cellulose and substituted methyl cellulose, such as hydroxypropylmethyl cellulose appear to be usable. Other hydromodifiers which are particularly useful include hydroxyethyl cellulose, e.g., "Natrosol 250;" partially hydrolyzed acrylamide polymer, e.g., "Separan NP 10;" and acrylamide polymer, e.g., "Superfloc 16."

The hydromodifier will be present in a concentration of 0.05 to 10, preferably 0.10 to 1.5, more preferably 0.15 to 0.70 weight percent. Generally, with the preferred hydromodifier used in the preferred ranges, the unit strength of extruded structures increases as the percentage of the hydromodifier in the extruded composition is increased with a given water content. The results of the test conducted in accordance with the present disclosure indicate that to produce products having the strength and other desired physical characteristics, the hydromodifier should be an organic substance having a molecular weight in excess of about 400.

If desired, a number of other materials commonly incorporated into cementitious articles may be included in the compositions of this invention. These include auxiliary cementing agents of which a particular preferred material is silica, either pure or in one of its many common combined forms. Silica flour, which is essentially quartz, is particularly useful for this purpose but other siliceous materials may be employed, such as diatomite, fly ash, calcined clay, fine sand, blast furnace slag, and similar materials. The siliceous auxiliary cementing agent will be present in a concentration of from 0 to 60 weight percent, preferably 5 to 50 weight percent, and more preferably 5 to 30 weight percent with natural fibers and 30 to 50 weight percent with synthetic fibers. The weight ratio of plaster of Paris to siliceous auxiliary cementing agent will be from about 1.3 to about 16:1, preferably from about 1:2 to about 7:1.

One may also include additional particulate materials in the composition which are relatively inert, i.e., do not in general react to any appreciable extent with the plaster of Paris in forming the final binding matrix. Such materials are referred to as fillers. Examples of such materials are stone flour, ground shale, kaolin, perlite and similar aggregates. Generally up to about 25 percent by weight of fillers, and particularly up to 10 percent by weight, may be employed in the composition. Some materials which act primarily as fillers do contain silica or equivalent materials and will function to a limited extent as auxiliary cementing agents (e.g., perlite), but are not here classified as such. Fillers are usually employed to give final products lower density. Fillers may also be used to modify the workability and other physical properties of the products. Since a lower density usually results in decreased strength, fillers are not recommended where final structures of higher strength are desired. The art is well acquainted with the advantages and disadvantages of the common fillers and the various limitations which should be observed in their use.

Other materials or additives may be incorporated in the compositions for special purposes. For example, if a colored product is desired, dyes and pigments may be included. Similarly, setting retarders may be incorporated to control the rate of setting of the plaster of Paris. A number of chemical retarders are known and are available commercially. Typical are some salts of organic acids such as calcium acetate and sodium citrate. Most preferred, however, because of their effectiveness in quite low concentrations, are retarders of ground horse hoof and animal hair which are essentially "protein type" retarders. Wetting agents, flexing agents, plasticizing agents or similar additives may also be used as may lubricants such as mineral oil, glycerine or commercial detergents. Viscosity control agents such as natural gums, corn starch, or substituted cellulose ethers (which do not pass the cement slurry tests and are, therefore, not hydromodifiers) may also be incorporated. Retarders will normally be present in concentrations of from 0.05 to 0.5 weight percent. Many of the other materials will be present in amounts of from 0.1 to 5.0 weight percent. The total amount of supplemental materials will ordinarily be no more than about 25 weight percent of the composition and preferably no more than about 10 weight percent. The extrudable compositions herein will contain water in the ratio of 0.20 to 0.80 parts by weight per part by weight of total dry solids. Preferably the ratio will be 0.25 to 0.65 parts by weight per part by weight of dry solids. The water content so measured will include all non-chemically combined water in the system, such as the water portion of the latices.

The mixing and handling of the new compositions prior to extrusion or other mechanical plastic forming may be carried out in variety of ways. Generally, it is advisable to form a dry furnish, i.e., mixture, of all dry ingredients as a preliminary step in the operation. However, if special mixing or conveying equipment is available, it is possible to mix the plaster of Paris, latex, fiber, hydromodifier, water and other ingredients, if any, together all at once and pass this mixture immediately to the extruding or other mechanical forming equipment. This type of arrangement can be used to provide a completely continuous operation in which the individual ingredients for the final products are charged into suitable hoppers or containers in the equipment line, from which they are discharged by suitable weighing or measuring devices into a continuous mixer and thence to the extruder or other plastic forming equipment.

Many of the hydromodifiers can be mixed with the dry ingredients to form a dry premix. This type of operation may be desirable where facilities or equipment are not available for handling and preparing large quantities of aqueous solutions of the hydromodifiers. However, the dry premix procedure is not applicable to all of the hydromodifiers, since some of them cannot be suitably dissolved or dispersed in water in the presence of the plaster of Paris or within the relatively short period of time which is available before the plaster starts to set up in the presence of water. Gelatin, glue, and polyvinyl alcohol are examples of hydromodifiers which are not amenable to dry premixing.

Various types of dry mixers can be employed in forming the dry furnish, e.g., rotating arm mixers, rotary tumbling mixers, beater mixers, air-suspension mixers or the like. The dry mixing should be carried out for a sufficient length of time to insure the formation of a uniform dry furnish, usually between about 1 to 15 minutes.

The wet mixing step is necessary to incorporate the latex and water into the composition. As previously indicated, this step can also be used to incorporate the hydromodifier by dissolving the hydromodifier in a suitable quantity of water to form a solution which is mixed with the dry furnish. Vigorous mixing conditions are recommended for this wet mixing step in order to insure thorough and intimate distribution of the latex, water, or aqueous solution with the other components of the composition. Sigma blade mixers, pug mills and similar high shear mixing equipment are useful for the wet mixing step. The wet mixing should not be carried out for too long a time because this could cause the plaster to begin to set before the composition is introduced into the extruder. Usually about two minutes to one hour of wet mixing is preferable with commercially available wet mixing equipment, depending upon the type used and the amount of retarded present. The use of continuous mixers for the wet mixing step opens up the possibility, as pointed out above, of eliminating the dry mixing step, of using continuous dry mixers, and of decreasing the time required for wet mixing.

Broken-screw type mixers, such as the "Ko Kneader" manufactured by Baker-Perkins Company, have been found particularly useful in wet mixing the compositions. Using this equipment, or any other suitable piece of equipment, the optimum mixing conditions are best determined by forming the extrusion compositions under varying mixing times and other conditions, extruding the resulting mixtures and testing the resulting products, and then using those mixing conditions which give final products of maximum strength and/or other desired properties.

After the wet mixing is completed, it may be desirable to subject the moist extrusion composition to a de-airing step, although this is not essential. The de-airing is best accomplished by placing the extrusion composition in a container and drawing a vacuum, or by continuously passing a stream of the moist extrusion material into a zone of reduced pressure through suitable inlet and outlet or openings. De-airing equipment of this type is readily available.

One of the noteworthy features of the new invention is the fact that it makes it possible to extrude the claimed compositions with standard, readily available extrusion equipment, using pressures of an order normally used in such equipment. In other words, it is not necessary to use special and complicated equipment in order to accomplish successful extrusion of the new compositions of this invention. Thus most of the standard forms of ram or screw extruders may be employed. The ram extruders are useful because they permit a broader range of ingredients to be used in the extrusion operations, but they have a disadvantage of operating primarily in a batch-type fashion. Screw extruders have the advantage of providing for continuous operation. Regardless of the form of extrusion equipment which is used, it should include some suitable arrangement for prompt cleaning after extrusion is completed because the compositions will set up, and if allowed to remain in the extruder too long, may require the use of soaking, chisels, air hammers or the like in order to free the extruder of the hardened material.

The structures which are obtained upon the extrusion of the new compositions are generally shape-retaining. Of course, since they are immediately after extrusion still in the unset state where they can be quite easily bent or deformed by the application of pressure, the unset extruded structures desirably should be supported against deformation until sufficiently set to withstand deforming pressure.

In addition to their use in extrusion operations, the novel compositions herein may also be used in molding operations. Standard molding equipment may be used in forming the new compositions. Furthermore, in carrying out the molding operations in accordance with this invention, it is no longer necessary to place the molding composition carefully in the mold and level it off, in order to insure that only a minimum amount of flow will be required when the mold is closed and pressure applied, to obtain the desired product. Molding materials formed of the new compositions containing the hydromodifiers will flow into offsets and around sharp corners or turns and the like without separation of water or stratification of the molding composition, to produce products having substantially uniform density throughout. Moreover, it is now possible using the new technique provided by this invention, to mold shapes and configurations of plaster compositions not possible heretofore because of the deep or intricate contours involved.

Table I illustrates typical examples of the unsatisfactory process runs or products which can occur when one or another of the necessary fiber, hydromodifier, or latex in the plaster of Paris composition is omitted. While in specific cases satisfactory products or runs were obtained in the absence of one or more of these components, it was found that consistently good results could not be obtained unless all four components were present. It will be seen that in the absence of fiber, the composition often did not extrude. While in the absence of hydromodifier or latex extruded samples were usually obtained, they were often of totally unacceptable quality. (All superscript numerals in the headings refer to the Notes in Table II below. Similar numerals in the headings of Tables III and IV below also refer to the Notes in Table II.)

TABLE I

Part A: Components[6]

| Run No. | Plaster Wt. % | Fiber Type[7]; Wt.% | Hydromodifier Type[1]; Wt.% | Latex Type[2]; Wt.% | Other Type[3]; | Wt.% | Water-to-Solids Ratio |
|---|---|---|---|---|---|---|---|
| 1 | 75 | none | M 0.39 | PVA 5.8 | R EP D | 0.3 17.3 7.7 | 0.375 |
| 2 | 75 | none | M 0.39 | PVA 5.8 | R S EP D | 0.3 7.7 9.6 7.7 | 0.375 |
| 3 | 60 | asbestos 20 | none | SBR 0.38 | R EP D | 0.3 13.3 6.7 | 0.375 |
| 4 | 60 | asbestos 20 | none | PHC 0.83 | R EP D | 0.3 13.3 6.7 | 0.58 |
| 5 | 60 | asbestos 10 | none | none | R EP D | 0.3 20 10 | 0.47 |
| 6 | 60 | asbestos 10 | none | none | R S | 0.3 30.0 | 0.33 |
| 7 | 60 | asbestos 20 | M 0.1 | none | R EP D | 0.3 13.3 6.7 | 0.45 |

TABLE I – Continued

Part B: Extrusion Pressure; Product Properties

| Run No. | Extrusion Pressure, psi | Dry Density[5] lb/cu ft | Flexural Modulus of Rupture[5], psi | Quality[4] |
|---|---|---|---|---|
| 1 | 250 | — | — | DNE |
| 2 | 400 | — | — | DNE |
| 3 | 400 | 61.1 | 200 | EU |
| 4 | 500 | 61.1 | 190 | EU |
| 5 | 500 | — | — | DNE |
| 6 | 400 | 117.6 | 720 | EU |
| 7 | 400 | 61.2 | 240 | EU |

TABLE II

Notes

1. Hydromodifier Type:
   M Substituted methyl cellulose and methyl cellulose; "Methocel MC" and "Methocel HG," Dow Chemical Co.
2. Latex Types:
   PVA Homopolymer of vinyl acetate, 55% solids; "Vinac," AIRCO Chemical Co.
   SBR Styrene-butadiene copolymer, about 50% solids; "Latex 460," Dow Chemical Co.
   PHC Petroleum hydrocarbon resin emulsion, about 50% solids; "Piccopale A-22," Pennsylvania Industrial Chemical Co.
3. Other Components:
   R Plastic setting retarder, protein-type, consisting of a mixture of ground horse hoof and animal hair.
   EP Expanded perlite, about 70–57% $SiO_2$, dry density about .5–8 lb/ft$^3$.
   D Diatomite, about 90% $SiO_2$, dry density about 8–10 lb/ft$^3$.
   S Silica flour, Blaine Surface Area of about 260 cm$^2$/g.
4. Product Quality
   DNE Did not extrude
   EU Extruded, but product was unsatisfactory because of substantial cracking, tearing, lumps, high porosity, high density, etc.
   EA Extruded, acceptable quality
5. Each value represents the average of several samples.

TABLE II – Continued

Notes

6. All components are measured on a dry basis; water of solution, as with the latices, is included in the water-to solids ratio.
7. All asbestos used was grade 6D asbestos fiber obtained by the Johns-Manville Corp. from the Jeffery Mine, Asbestos, Quebec, Canada.

The process of this invention and the superior plaster of Paris products obtained are exemplified by the data in Table III below. It will be seen that highly satisfactory samples can be obtained with a wide variety of fibers. Further, a wide variety of latices give good results; in addition to the vinyl acetate homopolymer, styrene-butadiene copolymer, and petroleum hydrocarbon resin emulsion latices listed in Table II, latices of a nonionic acrylic-methacrylic ester copolymer ("Rhoplex AC-34," Rohm and Haas Co.; about 46% solids) and a vinyl acetate-dibutyl maleate copolymer ("Flexbound 800;" AIRCO Chemical Co.; about 52% solids) have been used with success.

TABLE III

Part A: Components[6]

| Run No. | Plaster Wt.% | Fiber Type[7]; Wt.% | Hydromodifier Type[1]; Wt.% | Latex Type[2]; Wt.% | Other Type[3]; | Wt.% | Water-to-Solids Ratio |
|---|---|---|---|---|---|---|---|
| 8 | 70 | chopped wood 5 | M 0.2 | PVA 2.5 | R S | 0.3 25 | 0.25 |
| 9 | 70 | chopped wood 10 | M 0.2 | PVA 2.5 | R S | 0.3 20 | 0.32 |
| 10 | 74.2 | chopped glass 1.2 | M 0.33 | PVA 6.0 | R EP D | 0.3 12.3 12.3 | 0.375 |
| 11 | 74.0 | chopped rayon 1.2 | M 0.33 | PVA 6.0 | R EP D | 0.3 16.6 8.2 | 0.375 |
| 12 | 70 | asbestos 20 | M 0.15 | PVA 5 | R S | 0.3 10.0 | 0.38 |
| 13 | 60 | asbestos 20 | M 0.067 | PVA 0.5 | R S | 0.3 20.0 | 0.37 |
| 14 | 60 | asbestos 20 | M 0.15 | PVA 2 | R S | 0.3 20.0 | 0.33 |

Part B: Extrusion Pressure; Product Properties

| Run No. | Extrusion Pressure, psi | Dry Density[5] lb/cut ft | Flexural Modulus of Rupture[5], psi | Quality[4] |
|---|---|---|---|---|
| 8 | 200 | 93.9 | 1280 | EA |
| 19 | 200 | 80.5 | 1210 | EA |
| 10 | 400 | 72.4 | 1300 | EA |
| 11 | 450 | 69.4 | 1135 | EA |
| 12 | 700 | 82.2 | 1980 | EA |
| 13 | 380 | 88.0 | 1105 | EA |
| 14 | 550 | 83.4 | 1980 | EA |

The wide variety of component concentrations which are operable in the invention are illustrated in Table IV below. The exemplary system is that most preferred: the asbestos fiber/plaster of Paris/vinyl acetate homopolymer latex/methyl cellulose hydromodifier system. It will be immediately evident that in the absence of the latex the samples obtained are considerably inferior in strength.

flow characteristics, and capacity for resisting dewatering under relatively high pressures so as to enable the mixture to flow and to prevent the separation of an appreciable amount of water from the mixture, when said mixture is subjected to pressures of considerable magnitude such as is normally developed in plastic forming operations exemplified by those employing ram and auger ex-

TABLE IV

Part A: Components[a]

| Run No. | Plaster Wt.% | Asbestos Fiber Wt.% | Methyl Cellulose Hydromodifier Wt.% | Latex Type[2]; | Latex WT.% | Other Type[3]; | Other Wt.% | Water-to-Solids Ratio |
|---|---|---|---|---|---|---|---|---|
| 15 | 60 | 20 | 0.1 | none | | R | 0.3 | 0.45 |
| | | | | | | EP | 13.3 | |
| | | | | | | D | 6.7 | |
| 16 | 66.7 | 10 | 0.1 | none | | R | 0.3 | 0.45 |
| | | | | | | EP | 15.0 | |
| | | | | | | D | 8.3 | |
| 17 | 70 | 5 | 0.1 | none | | R | 0.3 | 0.52 |
| | | | | | | EP | 16.0 | |
| | | | | | | D | 9.0 | |
| 18 | 67.7 | 13.7 | 0.3 | PVA 5 | | R | 0.3 | 0.54 |
| | | | | | | EP | 10.0 | |
| | | | | | | D | 10.0 | |
| 19 | 60 | 20 | 0.6 | PVA 5 | | R | 0.3 | 0.54 |
| | | | | | | EP | 10.0 | |
| | | | | | | D | 10.0 | |
| 20 | 60 | 20 | 0.6 | PVA 2 | | R | 0.3 | 0.55 |
| | | | | | | EP | 10.0 | |
| | | | | | | D | 10.0 | |
| 21 | 60 | 20 | 0.15 | PVA 5 | | R | 0.3 | 0.33 |
| | | | | | | S | 20.0 | |
| 22 | 60 | 20 | 0.07 | PVA 5 | | R | 0.3 | 0.33 |
| | | | | | | S | 20.0 | |
| 23 | 60 | 20 | 0.067 | PVA 1 | | R | 0.3 | 0.31 |
| | | | | | | S | 20.0 | |
| 24 | 70 | 20 | 0.15 | PVA 5 | | R | 0.3 | 0.38 |
| | | | | | | S | 10.0 | |
| 25 | 60 | 20 | 0.067 | PVA 0.5 S | 20.0 | R | 0.3 | 0.37 |
| 26 | 60 | 20 | 0.15 | PVA 2 | | R | 0.3 | 0.33 |
| | | | | | | S | 20.0 | |

Part B: Extrusion Pressure; Product Properties

| Run No. | Extrusion Pressure, psi | Dry Density[5], lb/cu ft | Flexural Modulus of Rupture[5], psi | Quality[4] |
|---|---|---|---|---|
| 15 | 400 | 61.2 | 240 | EU |
| 16 | 700 | 69.2 | 560 | EU |
| 17 | 600 | 68.1 | 450 | EU |
| 18 | 400 | 66.3 | 1250 | EA |
| 19 | 500 | 63.6 | 1400 | EA |
| 20 | 450 | 65.4 | 1290 | EA |
| 21 | 550 | 88.6 | 2330 | EA |
| 22 | 600 | 90.0 | 2400 | EA |
| 23 | 450 | 92.0 | 1945 | EA |
| 24 | 700 | 82.2 | 1980 | EA |
| 25 | 380 | 88.0 | 1105 | EA |
| 26 | 550 | 83.4 | 1980 | EA |

What I claim is:

1. A process for the production of good quality, shaped, set plaster of Paris products, which comprises:

a. providing an unset mixture comprising, on a dry basis, 30 to 80 weight percent of plaster of Paris, 0.1 to 30 weight percent of fiber, 0.05 to 10 weight percent of hydromodifier, 0.5 to 10.0 weight percent of latex, and 0 to 60 weight percent of auxiliary cementing agent, with individual concentrations within these ranges selected to total 100 weight percent, and water in a water:solids weight ratio of from about 0.20:1 to about 0.80:1, with the proportionate amounts being such as to cause said mixture to be a plastic tractable mixture having shape retaining characteristics, enhanced plastic flow characteristics, and capacity for resisting dewatering under relatively high pressures so as to enable the mixture to flow and to prevent the separation of an appreciable amount of water from the mixture, when said mixture is subjected to pressures of considerable magnitude such as is normally developed in plastic forming operations exemplified by those employing ram and auger extruders;

b. plastic forming said mixture under pressure of the order described in part (a) above, without separating an appreciable amount of water from said mixture, to produce a shaped body which is generally shape retaining; and c. subjecting said shaped body to plaster of Paris setting conditions, to set said shaped body and impart strength to the resulting shape retaining set product.

2. The process of claim 1 wherein said fiber is a natural fiber and is present in a concentration of 2 to 30 weight percent on a dry basis.

3. The process in claim 2 wherein said natural fiber is a natural inorganic fiber.

4. The process of claim 3 wherein said natural inorganic fiber is asbestos.

5. The process of claim 1 wherein said fiber is a synthetic fiber and is present in a concentration of 0.1 to 2.5 weight percent on a dry basis.

6. The process of claim 5 wherein said synthetic fiber is a synthetic inorganic fiber.

7. The process of claim 6 wherein said synthetic inorganic fiber is glass fiber.

8. The process of claim 1 wherein said latex is a synthetic polymer emulsion.

9. The process of claim 8 wherein said synthetic polymer emulsion is an emulsion of a synthetic polymer selected from the group consisting of butadiene polymers, butadiene-sytrene copolymers, butadiene-acrylonitrile copolymers, and polychloroprene.

10. The process of claim 8 wherein said synthetic polymer emulsion is an emulsion of a synthetic polymer selected from the group consisting of polyvinyl chloride, polyvinylidene chloride, polystyrene, polymethyl methacrylate, polyethyl acrylate, polyvinyl acetate, copolymers of acrylic and methacrylic acid esters, copolymers of vinyl acetate and dibutyl maleate, terpolymers of butadiene, styrene and vinyl pyridine, polyvinyl butyral polymers, and polytetrafluorethylene polymers.

11. The process of claim 1 wherein said latex is an emulsion of a natural polymer.

12. The process of claim 11 wherein said natural polymer is a natural rubber.

13. The process of claim 11 wherein said natural polymer is a high molecular weight rubber-like hydrocarbon polymer derived from crude oil.

14. The process of claim 1 wherein said hydromodifier is selected from the group consisting of methyl cellulose, substituted methyl cellulose, ethylene oxide polymers, and acrylamide polymers.

15. The process of claim 14 wherein said hydromodifier is selected from the group consisting of methyl cellulose, hydroxypropylmethyl cellulose, hydroxethyl cellulose, ethylene oxide polymers, acrylamide homopolymer and partially hydrolyzed acrylamide polymer.

16. The process of claim 1 wherein said mixture comprises, on a dry basis, 45 to 75 weight percent of plaster of Paris, 2 to 30 weight percent of a natural fiber, 0.05 to 10 weight percent of hydromodifier, 0.5 to 10.0 weight percent of latex and 5 to 50 weight percent of a siliceous auxiliary cementing agent, with the concentrations individually selected to total 100 weight percent, and water in a water:solids weight ratio in the range of from about 0.25:1 to about 0.65:1.

17. The process of claim 16 wherein said siliceous auxiliary cementing agent is present in a concentration of from 5 to 30 weight percent on a dry basis.

18. The process of claim 17 wherein said siliceous auxiliary cementing agent is selected from the group consisting of pure silica, silica flour, quartz, diatomite, fly ash, calcined clay, fine sand and blast furnace slag.

19. The process of claim 16 also containing up to 25 weight percent on a dry basis of filler.

20. The process of claim 19 wherein said filler is selected from the group consisting of stone flour, ground shale, kaolin and perlite.

21. The process of claim 16 wherein said composition also includes 0.05 to 0.5 weight percent on a dry basis of a plaster of Paris retarder.

22. The process of claim 1 wherein said unset mixture comprises, on a dry basis, 45 to 75 weight percent of plaster of Paris, 3 to 23 weight percent of natural fiber, 0.10 to 1.5 weight percent of hydromodifier, 0.9 to 6.0 weight percent of latex, and 5 to 30 weight percent of siliceous auxiliary cementing agent.

23. The process of claim 1 wherein said unset mixture comprises, on a dry basis, 50 to 70 weight percent of plaster of Paris, 5 to 20 weight percent of natural fiber, 0.15 to 0.70 weight percent of hydromodifier, 1.0 to 5.0 weight percent of latex, and 5 to 30 weight percent of siliecous auxiliary cementing agent.

24. The process of claim 1 wherein said plastic forming of said mixture under pressure comprises extruding said mixture.

25. The process of claim 1 wherein said plastic forming of said mixture under pressure comprises molding said mixture.

26. The shape retaining set product of the process of claim 1.

\* \* \* \* \*

PO-1050
(5/69)

UNITED STATES PATENT OFFICE
CERTIFICATE OF CORRECTION

Patent No. 3,852,083           Dated May 2, 1975

Inventor(s) Julie Chi-sun Yang

It is certified that error appears in the above-identified patent and that said Letters Patent are hereby corrected as shown below:

Column 2, line 6 — "posses" should be "possess"

Column 3, Table-Hydromodifer "0.50-10" should be "0.05-10"

Column 8, line 23 — "glud" should be "glue"

Column 9, line 10 — "1.3" should be 1:3

Column 11, line 10 — "valves" have been left out

TABLE I    Type 2
3.   SBR "0.38" should be "0.83"

7.   Delete "EP" from type 2 column and put in type 3 column
      Delete "13.3" from type 3 column and put in wt.% column TABLE IV
25. Delete "s" from type 2 column and put in type 3 column
       Delete "20.0 from type 3 column and put in "wt.% column Signed and Sealed this sixth Day of January 1976

[SEAL]

Attest:

RUTH C. MASON           C. MARSHALL DANN
*Attesting Officer*           *Commissioner of Patents and Trademarks*